US009294988B2

(12) United States Patent
Vallurupalli et al.

(10) Patent No.: US 9,294,988 B2
(45) Date of Patent: Mar. 22, 2016

(54) CREATING A PREFERRED PLMN LIST FOR FASTER SERVICE ACQUISITION

(71) Applicant: Amazon Technologies, Inc., Reno, NV (US)

(72) Inventors: Pratima Vallurupalli, San Jose, CA (US); Siva Rama Kumar Somayajula, Palo Alto, CA (US); Subram Narasimhan, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/460,038

(22) Filed: Aug. 14, 2014

(65) Prior Publication Data
US 2014/0357263 A1 Dec. 4, 2014

Related U.S. Application Data

(62) Division of application No. 13/069,228, filed on Mar. 22, 2011, now Pat. No. 8,848,660.

(51) Int. Cl.
*H04W 48/08* (2009.01)
*H04W 48/18* (2009.01)
*H04W 48/16* (2009.01)

(52) U.S. Cl.
CPC .............. *H04W 48/08* (2013.01); *H04W 48/16* (2013.01); *H04W 48/18* (2013.01)

(58) Field of Classification Search
None
See application file for complete search history.

(56) References Cited

U.S. PATENT DOCUMENTS

| 8,848,660 | B2 | 9/2014 | Vallurupalli et al. |
| 2005/0190716 | A1 | 9/2005 | Buckley et al. |
| 2006/0172737 | A1 | 8/2006 | Hind et al. |
| 2006/0234705 | A1 | 10/2006 | Oommen |
| 2006/0245392 | A1 | 11/2006 | Buckley et al. |
| 2007/0004405 | A1* | 1/2007 | Buckley et al. ............... 455/434 |
| 2008/0182615 | A1* | 7/2008 | Xue et al. ................... 455/552.1 |
| 2010/0015978 | A1 | 1/2010 | Yoon et al. |
| 2010/0085935 | A1 | 4/2010 | Chin |
| 2010/0110890 | A1 | 5/2010 | Rainer et al. |
| 2011/0021195 | A1 | 1/2011 | Cormier et al. |
| 2012/0243467 | A1 | 9/2012 | Vallurupalli et al. |

FOREIGN PATENT DOCUMENTS

| EP | 2282586 A1 | 2/2011 |
| GB | 2375627 A | 11/2002 |
| JP | 2010056892 | 3/2010 |

(Continued)

OTHER PUBLICATIONS

USPTO Non-Final Office Action for U.S. Appl. No. 13/069,228 mailed Sep. 10, 2013.

(Continued)

*Primary Examiner* — Kwang B Yao
*Assistant Examiner* — Adam Duda
(74) *Attorney, Agent, or Firm* — Lowenstein Sandler LLP

(57) ABSTRACT

A processing device receives network data from a plurality of user devices. The network data identifies networks available to provide roaming service to at least one of the plurality of user devices at one or more geographical locations. The processing device generates at least one list of identifiers of preferred networks for at least one of the geographical locations based on the network data. The processing device sends the list of identifiers to the plurality of user devices.

20 Claims, 8 Drawing Sheets

(56) References Cited

FOREIGN PATENT DOCUMENTS

| WO | WO2008150145 | A2 | 12/2008 |
|---|---|---|---|
| WO | WO2012094677 | A2 | 7/2012 |

OTHER PUBLICATIONS

USPTO Final Office Action for U.S. Appl. No. 13/069,228 mailed Feb. 4, 2014.

USPTO Notice of Allowance for U.S. Appl. No. 13/069,228 mailed Sep. 10, 2013.

International Search Report and Written Opinion for PCT/US2012/029969 mailed Aug. 8, 2012.

3GPP TS 11.14 V8.18.0 (Jun. 2007), "3rd Generation Partnership Project; Specification of the SIM Application Toolkit of the Subscriber Identity Module—Mobile Equipment (SIM-ME) Interface (Release 1999)," Jun. 2007, 3GPP, all pages).

* cited by examiner

CREATING A PREFERRED PLMN LIST FOR FASTER SERVICE ACQUISITION

CROSS-REFERENCE TO RELATED APPLICATIONS

This application is divisional of U.S. patent application Ser. No. 13/069,228, filed on Mar. 22, 2011, which is hereby incorporated by reference.

TECHNICAL FIELD

Embodiments of the invention relate to user devices, and more particularly, to using a preferred public land mobile network (PLMN) list for a faster service acquisition.

BACKGROUND

In today's wireless communication networks, Public Land Mobile Networks (PLMNs) have been established to provide land mobile telecommunications service to user devices such as electronic book readers, cellular telephones, personal digital assistants (PDAs), portable media players, tablet computers, netbooks, and the like. Generally, each service provider operates its own PLMN, and the number of PLMNs in a country may vary from a single PLMN in a small country to as many as fifty or more in a large country like India.

When a user device is located outside of the area covered by its own service provider's PLMN (the Home PLMN), the user device attempts service acquisition on another PLMN, which is commonly known as roaming. Typically, a prioritized list of PLMNs that the user device is allowed to access is stored on a Subscriber Identity Module (SIM) card. The entries and prioritization in the list are usually based on agreements contracted among the various service providers. When a user device operates in the automatic selection mode, the user device consults the preferred PLMN list defined by the network operator, and attempts to register on a PLMN in accordance with the listed priority. If registration cannot initially be obtained on the home PLMN, the user device will then attempt to register on the next highest priority PLMN on the list, and so on, until service is acquired. However, due to limited storage space on SIM cards, preferred PLMN lists stored on SIM cards typically cover such regions as U.S., Canada and Europe and do not cover several regions, including, for example, India, South America and Asia. When the SIM card does not have a preferred PLMN list for the region in which the user device is currently located, the user device identifies PLMNs with a sufficient signal strength that are present in the current location and randomly selects one of these PLMNs. If the selected PLMN does not have a roaming agreement with the service provider of the user device, the selected PLMN rejects the user device's request for service and the user device has to select a different PLMN. In regions that have a large number of PLMNs (e.g., India or Asia), a user device may have to hop between many different PLMNs until it is able to acquire roaming service.

When a user device operates in the manual selection mode, the user is given an opportunity to select an available PLMN. In particular, the user will have to review the list of PLMNs available at the current location and select a specific PLMN from the list. This is likely to be inconvenient and time-consuming for the majority of users who usually do not know which of the available PLMNs have a roaming agreement with their service providers.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for utilizing a list of preferred networks for faster service acquisition by a user device are described. A user device may be any content rendering device that includes a wireless modem for connecting the user device to a network. Examples of such user devices include electronic book readers, cellular telephones, personal digital assistants (PDAs), portable media players, tablet computers, netbooks, and the like. A user device may connect to a network to obtain content from an item providing system or to perform other activity.

In one embodiment, a list of preferred networks for a specific geographical region is stored in a modem of a user device. The list of preferred networks may be created based on data obtained by multiple user devices during their operation in this geographical region. A server may collect the obtained data from the user devices, create a list of preferred networks based on the collected data, and distribute the created list to the user devices. As more data becomes available, the server may modify the list and re-distribute it to the user devices. In addition, in some embodiments, individual user devices dynamically update their lists based on current network data.

By maintaining up-to-date lists of preferred networks, embodiments of the present invention significantly reduce the service acquisition time and simplify the network selection process.

Figure 1:
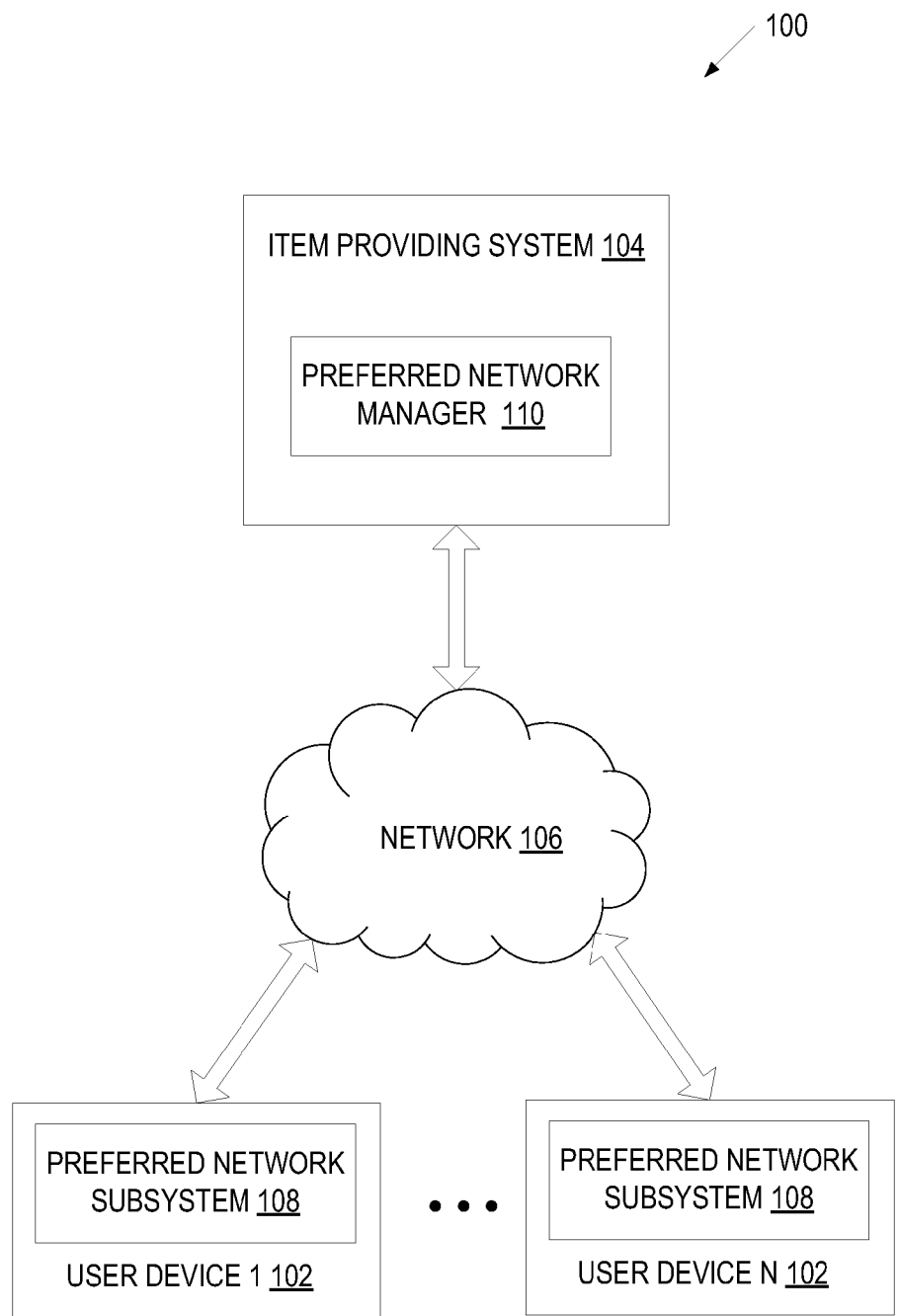
FIG. 1 is a block diagram of an exemplary network architecture in which embodiments of the invention may operate.

FIG. 1 is a block diagram of exemplary network architecture 100 in which embodiments of the invention may operate. The network architecture 100 may include an item providing system 104 and multiple user devices 102 coupled to the item providing system 104 via a network 106 (e.g., public network such as the Internet or private network such as a local area network (LAN)).

The user devices 102 are variously configured with different functionality to enable consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multimedia content and software updates. The user devices 102 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 104 downloads items, upgrades, and/or other information to the user devices 102 via the network 106. The item providing system 104 also receives various requests, instructions and other data from the user devices 102 via the network 106. The item providing system 104 may include one or more machines (e.g., one or more server computer systems, routers, gateways) that have processing and storage capabilities to provide the above functionality.

Communication between the item providing system 104 and a user device 102 may be enabled via any communication infrastructure. One example of such an infrastructure includes a combination of a wide area network (WAN) or a VPN and wireless infrastructure, which allows a user to use the user device 102 to purchase items and consume items without being tethered to the item providing system 104 via hardwired links. The wireless infrastructure may be provided by a network operator (service provider) system that can be implemented using various data processing equipment, communication towers, etc. Alternatively, or in addition, the network operator system may rely on satellite technology to exchange information with the user device 102. Yet alternatively, or in combination, the wireless infrastructure may be provided by an access point (e.g., WiFi access point) provider system.

The communication infrastructure may also include a communication-enabling system that serves as an intermediary in passing information between the item providing system 104 and the wireless network operator. The communication-enabling system may communicate with the wireless network operator via a dedicated channel, and may communicate with the item providing system 104 via a non-dedicated communication mechanism, e.g., a public network such as the Internet.

The item providing system 104 may pay the network operator a fee based on the aggregate use of the network operator system by all of the user devices 102. The item providing system 104 may recoup these costs through fees charged to the end-users separately or as part of other purchases (e.g., purchase of digital content) made by the end-users. Alternatively, the network operator may submit bills directly to individual users, or may submits bills to either the item providing system 104 (in aggregate) or to the individual users, at the option of the individual respective users.

A user device 102 is typically associated with a specific network operator (service provider) by means of a subscriber identity module (SIM) card. A SIM card may include predefined lists of preferred wireless networks (e.g., PLMNs) that a user device 102 should use when acquiring service outside of the area covered by its own network operator. The entries and prioritization in the lists are usually based on agreements contracted among the various network operators. Preferred network lists stored on the SIM card are typically limited to such regions as U.S., Canada and Europe and do not cover several regions including, for example, India, South America and Asia. Due to the lack of preferred network lists and a large number of local network operators, user devices in the above regions are known to spend significantly more time on service acquisition.

Embodiments of the invention overcome the above shortcomings by compiling lists of preferred networks for regions where long service acquisition times are reported. In one embodiment, the item providing system 104 hosts a preferred network manager 110 that collects network data obtained by multiple user devices 102 during their operation in a certain geographical region. Based on the collected data, the preferred network manager 110 creates a list of preferred networks for the geographical region, and distributes the created list to the user devices 102. In some embodiments, as more data becomes available, the preferred network manager 110 modifies the list and re-distributes it to the user devices 102.

User device 102 may host a preferred network subsystem 108 that stores in the modem one or more lists of preferred networks for relevant geographical regions. When the user device 102 attempts to acquire roaming service, the preferred network subsystem 108 uses a corresponding list of preferred networks to perform a network selection. In some embodiments, the preferred network subsystem 108 dynamically updates its list of preferred networks based on current network data. In some embodiments, the preferred network subsystem 108 periodically (or at a request of the item providing system 104) transfers its current list of preferred networks and/or collected network data to the item providing system 104.

Figure 2:
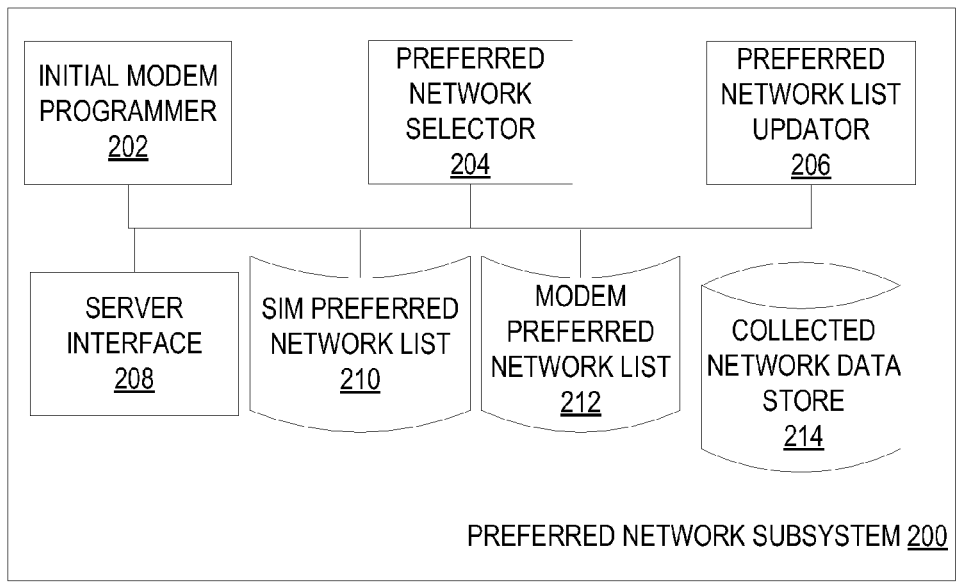
FIG. 2 is a block diagram of one embodiment of a preferred network subsystem.

FIG. 2 is a block diagram of one embodiment of a preferred network subsystem 200 hosted by a user device. The preferred network subsystem 200 may be the same as preferred network subsystem 108 of FIG. 1 and may include an initial modem programmer 202, a preferred network selector 204, a preferred network list updator 206, and collected network data store 214. The components of the preferred network subsystem 200 may represent modules that can be combined together or separated into further modules, according to some embodiments.

The user device includes a SIM card that stores predefined lists of preferred networks (e.g., SIM predefined network list(s) 210) that the user device should use when acquiring service outside of the area covered by its own network operator. The entries and prioritization in the lists are usually based on agreements contracted among the various network operators. In addition, the initial modem programmer 202 may pre-program the modem of the user device with one or more preferred network lists 212 for geographical regions that are known not to be reflected on the SIM card and where long service acquisition times were reported. The preferred network lists 212 may specify preferred networks by their mobile country codes (MCCs) and mobile network codes (MNCs). The preferred network lists 212 are created by a server (e.g., the item providing system 104) based on network data collected by other user devices operating in corresponding regions. The preferred network lists 212 may be loaded into non-volatile memory or secure memory (e.g., one time programmable (OTP) memory) on the modem during initial modem programming.

The preferred network selector 204 is responsible for searching for a network at various events including, for example, a power-on event, loss of service or coverage, a network registration failure, and a periodic scan for a higher priority network. In one embodiment, when selecting a network at power-on, loss of service or coverage, registration failure, the preferred network selector 204 first tries to find its last registered network or its home network. If neither of these networks are found, the preferred network selector 204 checks the SIM card to see if the SIM network list 210 specifies a network present at the current location of the user device. For the periodic scan for a higher priority network, the preferred network selector 204 tries to find a higher priority network that belongs to the SIM Preferred Network list 210.

If the SIM network list 210 specifies one or more available networks, the preferred network selector 204 selects the specified network, or one of the specified networks (according to a predetermined priority if more than one available network is specified), and attempts to register with the selected network (e.g., by sending a request for a packet switched (PS) registration to enable data communication, or a request for circuit switched (CS) registration to enable voice communication, or a request for both CS and PS registration). In one embodiment, depending on whether the registration is successful or not, the preferred network list updator 206 may record an indication of successful or unsuccessful registration with the selected network in the collected network data store 214.

If the SIM network list 210 does not specify any available networks or the network selected from the SIM network list 210 denies the registration request, the preferred network selector 204 accesses the preferred network list 212 stored in the modem to find one or more preferred networks that are available at the current location. Alternatively, the preferred network selector 204 starts the network selection process by accessing the modem's preferred network list 212 first, without reviewing the SIM network list 210.

If the preferred network list 212 in the modem includes one or more available networks, the preferred network list selects a network from the list 212. If the list 212 includes more than one available network, the selection is made according to a predefined priority. For example, the first priority can be assigned to 3G networks prioritized based on agreements contracted with the operators of these networks, and the second priority can be assigned to 2G networks prioritized based on agreements contracted with the operators of these networks. Upon selecting a network, the preferred network selector 204 attempts to register with the selected network. In one embodiment, depending on whether the registration is successful or not, the preferred network list updator 206 may record an indication of successful or unsuccessful registration with the selected network in the collected network data store 214. In one embodiment, if the attempt to register is unsuccessful, the preferred network list updator 206 deletes the selected network from the preferred network list 212 in the modem.

If the modem's preferred network list 212 does not specify any available networks or the network selected from the modem list 212 denies the registration request, the preferred network selector 204 identifies networks available at the current location. In one embodiment, the preferred network list updator 206 records the networks available at the current location in the collected data store 214. The preferred network list updator 206 then selects one of the available networks. In one embodiment, if the available networks include one or more high quality (signal strength above a threshold) 3G networks, the preferred network selector 204 selects a random high quality 3G network. If no high quality 3G network is available, the preferred network selector 204 selects a random high quality 2G network. If no high quality 3G or 2G network is available, the preferred network selector 204 selects a network with a low signal quality prioritized by the order of signal strength. Upon selecting a network, the preferred network selector 204 attempts to register with the selected network. In one embodiment, depending on whether the registration is successful or not, the preferred network list updator 206 may record an indication of successful or unsuccessful registration with the selected network in the collected network data store 214. In one embodiment, if the attempt to register is successful, the preferred network list updator 206 adds the selected network to the preferred network list 212 in the modem.

The server interface 208 periodically receives preferred network lists from the server and stores them in the modem, replacing the lists 212 or adding new lists 212. In addition, periodically or upon a server request, the server interface 208 provides current preferred network lists 212 and/or collected network data from the collected network data store 214 to the server. The collected network data may include a list of networks that have accepted network registration requests of the user device at specific locations, a list of networks that have denied network registration requests of the user device at specific locations, a list of networks available at specific locations, or any combination of the above. The collected network data store 214 may represent a single data structure or multiple data structures (databases, repositories, files, etc.) residing on one or more mass storage devices, such as magnetic or optical storage based disks, solid-state drives or hard drives.

Figure 3:
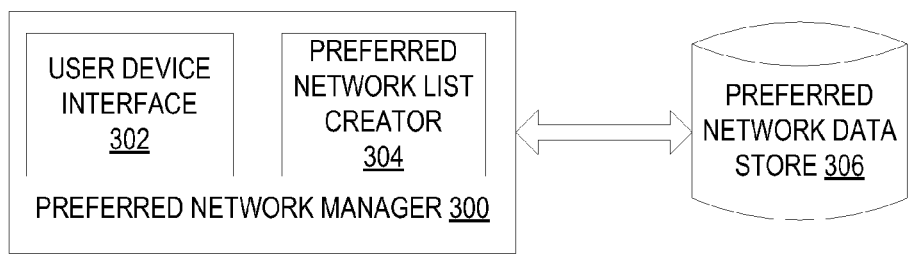
FIG. 3 is a block diagram of one embodiment of a preferred network manager.

FIG. 3 is a block diagram of one embodiment of a preferred network manager 300 hosted by a server (e.g., an item providing system). The preferred network manager 300 may be the same as preferred network manager 110 of FIG. 1. The preferred network manager 300 may include a user device interface 302, a preferred network list creator 304, and a preferred network data store 306. The components of the preferred network manager 300 may represent modules that can be combined together or separated into further modules, according to some embodiments.

The user device interface 302 receives network data and/or preferred network lists from various user devices and stores them in the preferred network data store 306. In addition, the user device interface 302 sends updated and/or new preferred network lists created by the preferred network list creator 304 to the user devices. Network data received from a user device may include a list of networks that have accepted network registration requests of the user device at specific locations, a list of networks that have denied network registration requests of the user device at specific locations, a list of networks available at specific locations, or any combination of the above. The preferred network list creator 304 analyzes the network data and/or preferred network lists received from multiple user devices, and creates new preferred network lists for individual geographical regions and/or updates existing preferred network lists of corresponding geographical regions based on the analysis. The preferred network list creator 304 then stores new and/or updated preferred network lists in the preferred network data store 306 for subsequent distribution to the user devices. The preferred network data store 306 may represent a single data structure or multiple data structures (databases, repositories, files, etc.) residing on one or more mass storage devices, such as magnetic or optical storage based disks, solid-state drives or hard drives.

In one embodiment, the preferred network list creator 304 provides recommendations to network operators with respect to roaming agreements based on the analysis of the collected network data. For example, if a network operator has a roaming agreement with another network operator but the network data collected from the user devices indicates that the other operator has denied their roaming service requests, the preferred network list creator 304 may recommend discontinuing the roaming agreement with this other operator. In another example, if multiple user devices report that a particular network is always available in a certain region, the preferred network list creator 304 may recommend the network operator to enter into an agreement with an operator of the available network.

Figure 4:
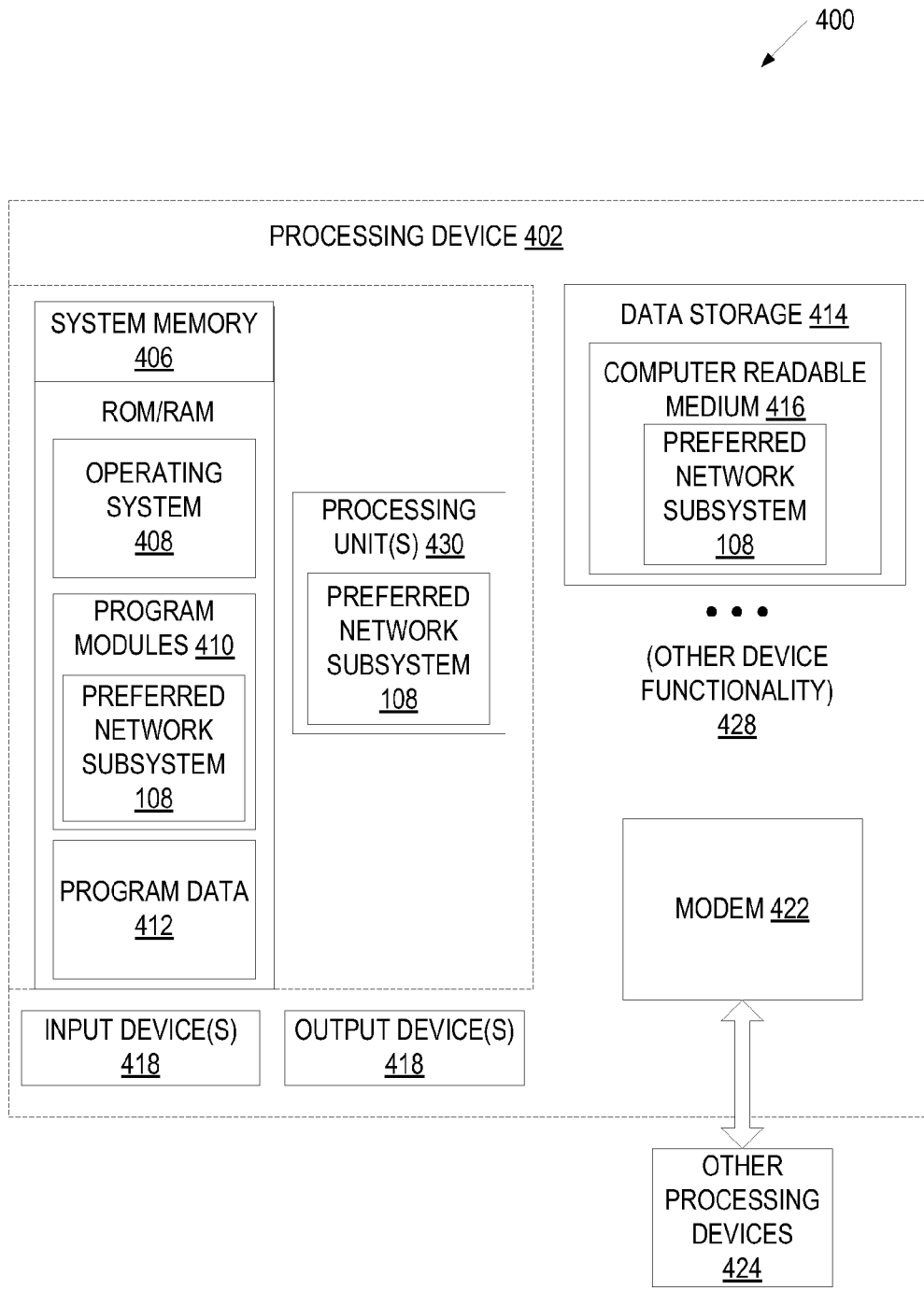
FIG. 4 is a block diagram illustrating an exemplary user device.

FIG. 4 is a block diagram illustrating an exemplary user device 400. The user device 400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 400 includes one or more processing units 404, such as one or more CPUs. The user device 400 also includes system memory 406, which may correspond to any combination of volatile and/or non-volatile storage mechanisms. The system memory 406 may store information which provides an operating system component 408, various program modules 410 including preferred network subsystem 108, program data 412, and/or other components. The user device 400 performs functions by using the processing unit(s) 404 to execute the preferred network subsystem 108 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the preferred network subsystem 108) embodying any one or more of the methodologies or functions described herein. As shown, instructions of the preferred network subsystem 108 may also reside, completely or at least partially, within the system memory 406 and/or within the processing unit(s) 430 during execution thereof by the user device 400, the system memory 406 and the processing unit(s) 430 also constituting computer-readable media. The instructions of the world SIM manager 108 may further be transmitted or received over a network.

The user device 400 may also include one or more input devices 418 (keyboard, mouse device, specialized selection keys, etc.) and one or more output devices 420 (displays, printers, audio output mechanisms, etc.). The user device 400 may further include a wireless modem 422 to allow the user device 400 to communicate via a wireless network with other computing devices 424, such as remote computers, the item providing system, and so forth. The wireless modem 422 may allow the user device 400 to receive a telephone ring and also communicate with the item providing system in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), and WiFi.

The above-enumerated list of modules is representative and is not exhaustive of the types of functions performed by the user device 400. As indicated by the label "Other Device Functionality" 428, the user device 400 may include additional functions.

Figure 5:
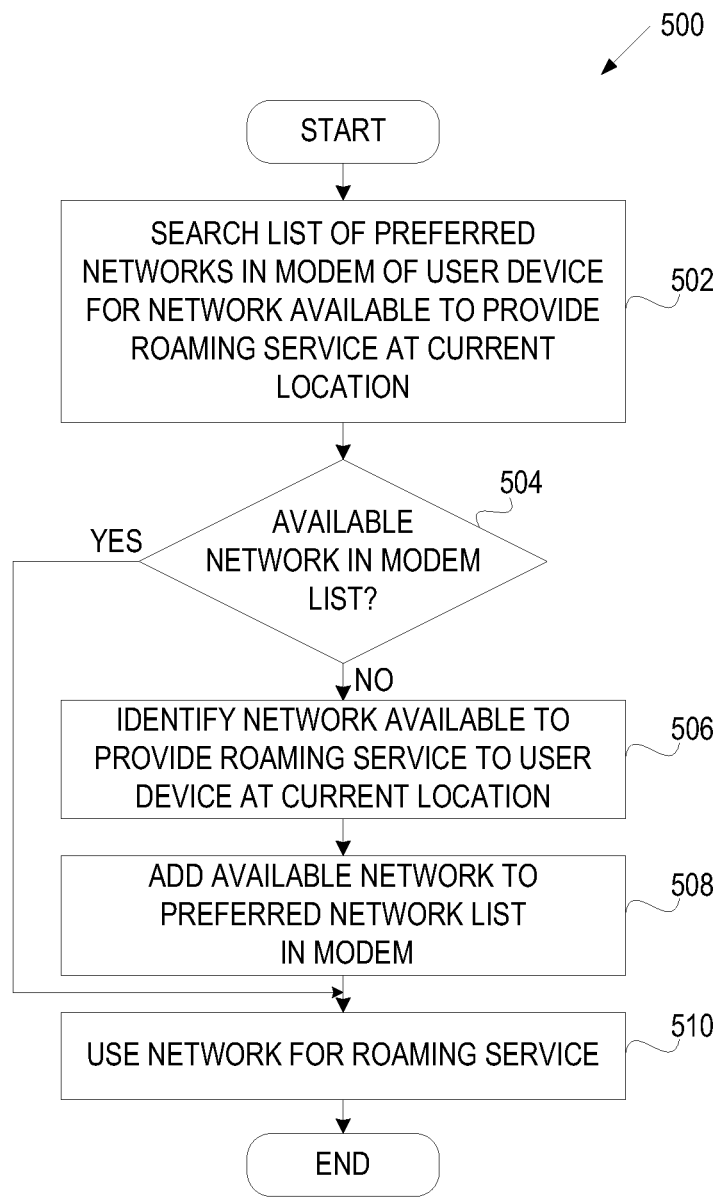
FIG. 5 is a flow diagram of one embodiment of a method for using a preferred network list for faster service acquisition.
Figure 6:
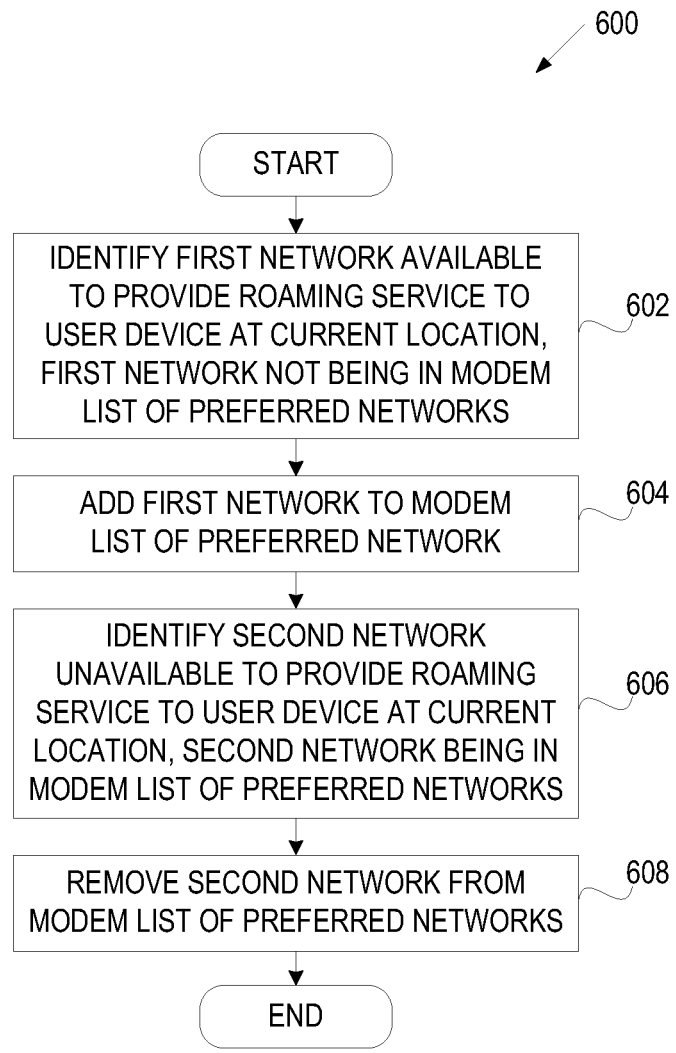
FIG. 6 is a flow diagram of one embodiment of a method for dynamically updating a list of preferred networks in a modem memory of a user device.
Figure 7:
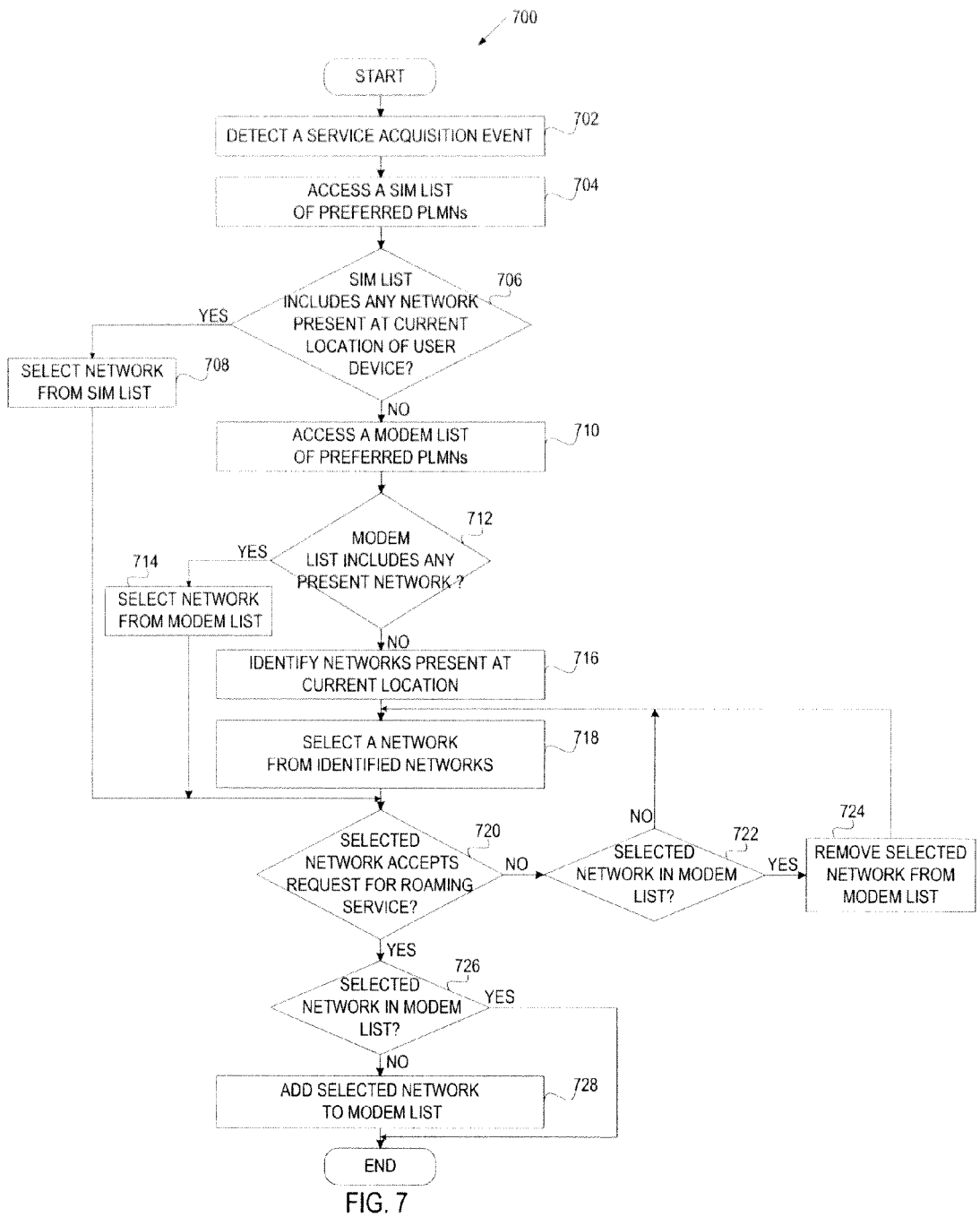
FIG. 7 is a flow diagram of one embodiment of a method for acquiring a roaming service.

FIGS. 5, 6 and 7 are flow diagrams of some embodiments of client-side methods. The methods are performed by processing logic that may comprise hardware (circuitry, dedicated logic, etc.), software (such as is run on a general purpose computer system or a dedicated machine), or a combination of both. In one embodiment, embodiments of the methods are performed by a user device (e.g., a preferred network subsystem 108 of user device 102 of FIG. 1).

FIG. 5 is a flow diagram of one embodiment of a method 500 for using a preferred network list in a user device modem for faster service acquisition. At block 502, the user device searches a preferred network list stored in the modem of the user device for a network available to provide roaming service to the user device at a current location. The modem's preferred network list is complied based on network data obtained by various user devices during the field testing and operation in regions such as India, Asia and South America where long (e.g., above a threshold) service acquisition times were reported. A network available to provide roaming service to a user device is a network that is present at a current location and has a roaming agreement with the network operator of the user device. In one embodiment, the user device searches the modem's preferred network list at power-up, loss of service or coverage, network registration failure, a periodic scan for a higher priority network, or a similar event. In one embodiment, for the power-up, loss of coverage and registration failure, the user device searches the modem's preferred network list upon determining that both the last registered network and the home network are unavailable at the current location and that the SIM network list does not include any of the networks available at the current location. For the periodic higher priority scan, the user device searches the modem's preferred network list upon determining that no other higher priority network that belongs to the SIM network list is available at the current location. One embodiment of finding a network available to provide roaming service at a current location will be discussed in more detail below in conjunction with FIG. 7.

At block 504, the user device determines whether the modem list of preferred networks includes a network available to provide roaming service to the user device at the current location. If so, the user device uses the network for roaming service (block 510). If not, the user device identifies a network available to provide roaming service to the user device at the current location (block 506). One embodiment of making the above determination and identifying an available network will be discussed in more detail below in conjunction with FIG. 7.

At block 508, the user device adds the network identified at block 506 to the modem preferred network list. In one embodiment, the user device provides the updated preferred network list stored in the modem to a server (e.g., an item providing system). The user device may provide the modem list to the server each time the modem list is updated, or upon a server request, or at predefined time intervals, or at predefined events (e.g., upon connecting to the server).

FIG. 6 is a flow diagram of one embodiment of a method 600 for dynamically updating a list of preferred networks in a modem of a user device. As the user device operates at a particular region, it performs a network selection process at various events discussed above. During each network selection process, the user device may attempt to register with one or more networks. Based on the registration results, the user device may dynamically update the modem list of preferred networks. In particular, when the user device identifies a network that is not on the modem list and that is available to provide roaming service to the user device at the current location (block 604), the user device adds this network to the modem's list of preferred network (block 606).

During the network selection process, the user device may also attempt to register with a network that is on the modem list of preferred networks and may receive a registration failure message in response (e.g., if the network does not allow roaming in the present area). When such a network is identified (block 606), the user device removes this network from the modem list of preferred networks (block 608).

FIG. 7 is a flow diagram of one embodiment of a method 700 for acquiring a roaming service. At block 702, the user device detects a service acquisition event that may occur, for example, at power-up, loss of service or coverage, registration failure or a periodic scan for a higher priority network, and determines that both last registered PLMN and the home PLMN are not present at the current location (for power-up, loss of coverage and registration failure). At block 704, the user device accesses a SIM list of preferred PLMNs. At block 706, the user device determines whether the SIM list includes any networks present at the current location of the user device. If so, the user device selects one of the present networks from the SIM list based on predefined priority (block 708) and proceeds to block 720. In the case of periodic higher priority scan, device determines if the SIM list contains any higher priority networks. If not, the user devices accesses a modem list of preferred PLMNs (block 710).

If the modem list includes any networks present at the current location, the user device selects a network present at the current location from the modem list (block 714) and proceeds to block 720. The selection can be done by first looking for a 3G network present at the current location and included in the modem list, and if such a 3G network is not found, then looking for a 2G network present at the current location and included in the modem list.

If the modem list does not include any networks present at the current location, the user device identifies networks available at the current location (block 716). At block 718, the user device selects one of the identified networks and proceeds to block 720. The selection can be made using a predefined priority. For example, if the available networks include one or more high quality (signal strength above a threshold) 3G networks, the user device may select a random high quality 3G network. If no high quality 3G network is available, the user device may select a random high quality 2G network. If no high quality 3G or 2G network is available, the user device may select one of networks with a low signal quality prioritized by the order of signal strength.

At block 720, the user device determines whether the selected network accepts the user device's request for roaming service (e.g., whether the selected network responded with a message indicating a successful PS and/or CS registration). If so, the user device determines whether the selected network is included in the modem list (block 726). If the selected network is not included in the modem list, the user device adds the selected network to the modem list of preferred networks (block 728). If the selected network is included in the modem list, method 700 ends.

If the selected network denies the user device request for roaming service at block 720 (e.g., the user device receives a message indicating a PS and/or CS registration failure), the user device determines whether the selected network is on the modem list of preferred networks (block 722). If not, the user device proceeds to block 718 to select the next network present at the current location according to the predetermined priority. If so, the user device removes the selected network from the modem list of preferred networks (block 724) and then proceeds to block 718 to select the next network present at the current location according to the predetermined priority.

Figure 8:
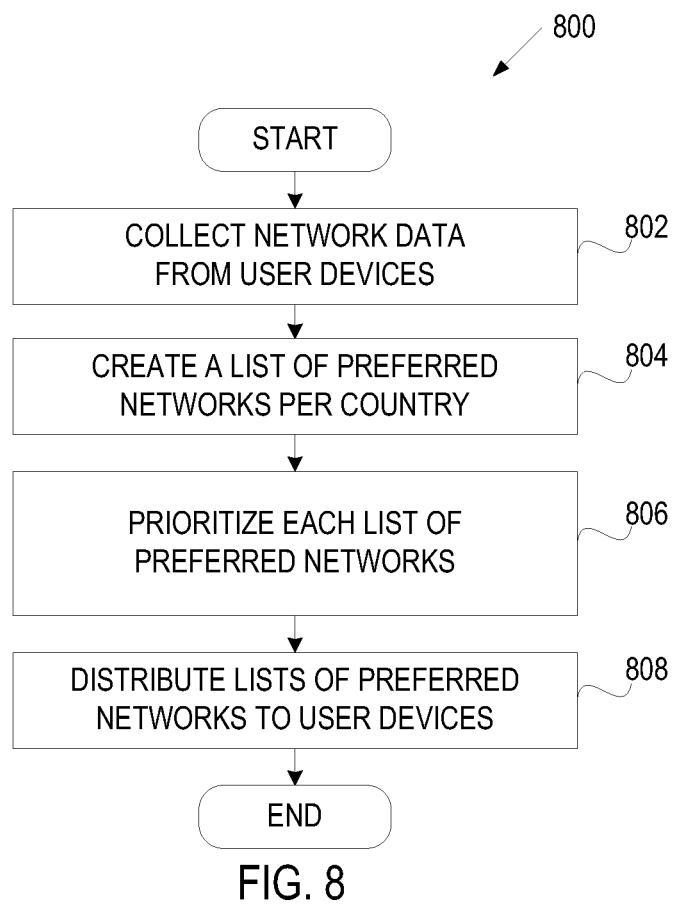
FIG. 8 is a flow diagram of one embodiment of a server-side method for creating lists of preferred networks.

FIG. 8 is a diagram of one embodiment of a server-side method for creating lists of preferred networks. The method is performed by processing logic that may comprise hardware (circuitry, dedicated logic, etc.), software (such as is run on a general purpose computer system or a dedicated machine), or a combination of both. In one embodiment, the method is performed by a server (e.g., a preferred network manager 110 of an item providing system 104 of FIG. 1).

Referring to FIG. 8, method 800 begins with the server collecting network data from user devices (block 802). Network data received from a user device may include one or more preferred network lists for one or more specific locations, a list of networks that have accepted network registration requests of the user device at specific locations, a list of networks that have denied network registration requests of the user device at specific locations, a list of networks available at specific locations, or any combination of the above.

At block 804, the server creates lists of preferred networks for individual regions (e.g., regions where long service acquisition times were reported) based on the collected network data. At block 806, the server prioritizes each list of preferred networks based on various characteristics including, for example, network characteristics (e.g., an applicable IMT standard such as 2G or 3G) and roaming charges. At block 808, the server distributes lists of preferred networks to user devices.

In one embodiment, the server periodically repeats operations performed at blocks 802 through 808 to create up-to-date lists of preferred networks. As server-created lists of preferred networks become more accurate and complete, they may become the main source of data for user devices during the network selection process, eliminating the need to use SIM card PLMN lists.

Figure 9:
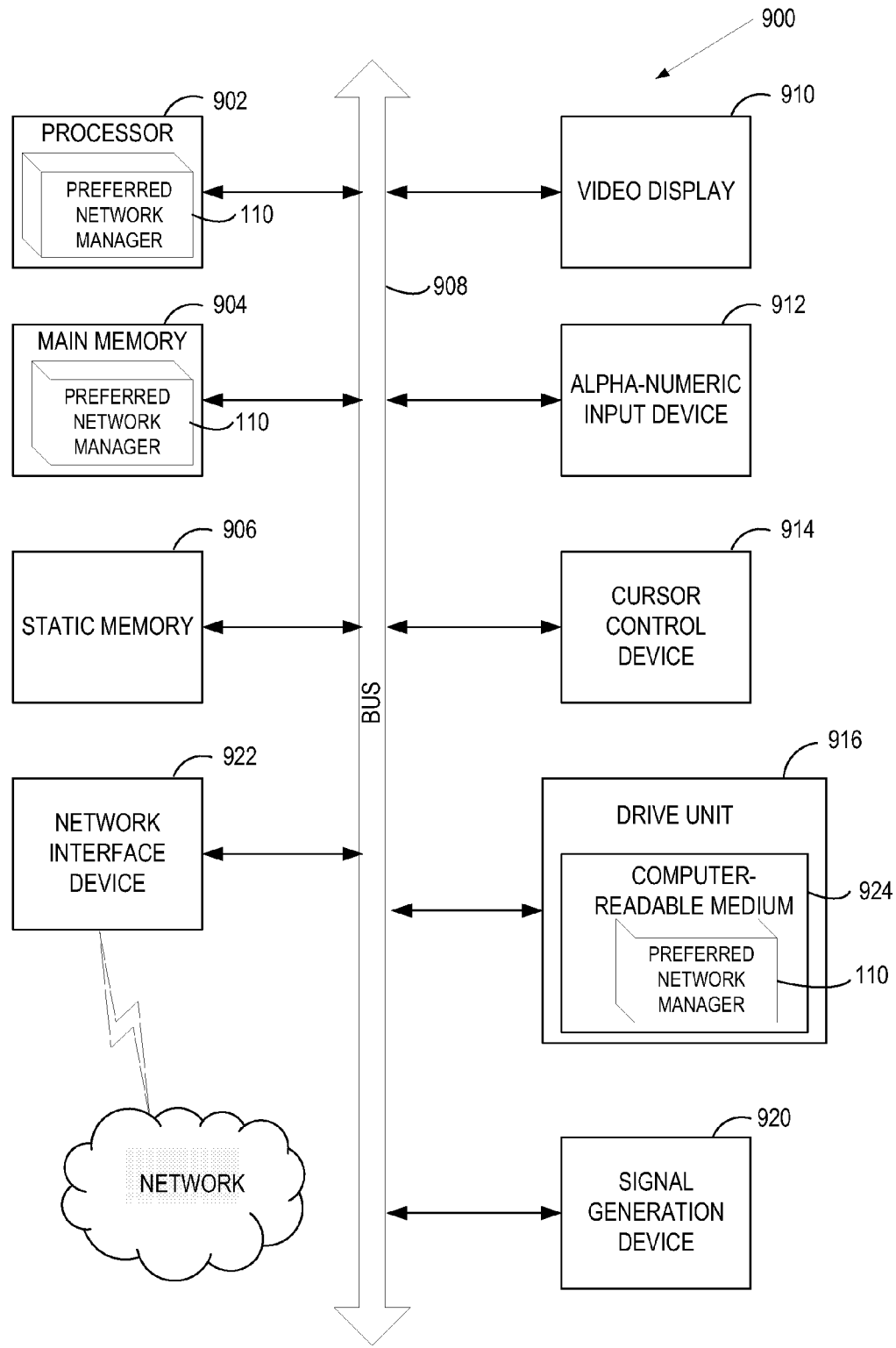
FIG. 9 illustrates an exemplary item providing system.

FIG. 9 illustrates an exemplary item providing system 900 in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 906.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the preferred network manager 110 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable medium 924 on which is stored one or more sets of instructions (e.g., instructions of preferred network manager 110) embodying any one or more of the methodologies or functions described herein. The preferred network manager 110 may also reside, completely or at least partially, within the main memory 904 and/or within the processor 902 during execution thereof by the computer system 900, the main memory 904 and the processor 902 also constituting computer-readable media. The preferred network manager 110 may further be transmitted or received over a network 920 via the network interface device 922.

While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device from a plurality of user devices, network data identifying one or more networks available to provide roaming service to at least one of the plurality of user devices at one or more geographical locations associated with the plurality of user devices;
   determining, by the processing device, one or more identifiers, wherein each identifier is associated with a corresponding network of the one or more networks from the network data;
   generating, by the processing device, a list of preferred networks associated with a first geographic location of the one or more geographical locations, the list comprising the one or more identifiers of the one or more networks; and
   sending, by the processing device, the list of preferred networks to a first user device of the plurality of user devices, the first user device being located at the first geographic location.

2. The method of claim 1, wherein the first geographical location corresponds to a region where a service acquisition time exceeds a threshold.

3. The method of claim 1, wherein the network data further identifies networks that have rejected service requests from any of the plurality of user devices at the first geographical location.

4. The method of claim 3, wherein generating the list of preferred networks furthers comprises:

creating a preliminary list of identifiers of networks that have accepted a roaming service request from at least one of the plurality of user devices; and removing from the preliminary list identifiers of networks that have rejected a roaming service request from at least one of the plurality of user devices at the first geographical location.

5. The method of claim 1, wherein generating the list of preferred networks further comprises prioritizing identifiers of the list of identifiers based on at least one of network characteristics or roaming charges.

6. The method of claim 1, wherein the network data further identifies one or more preferred networks for one of the plurality of user devices.

7. The method of claim 1, further comprising:

periodically receiving additional network data from the plurality of user devices;

updating, based on the additional network data, the list of identifiers; and sending the updated list of identifiers to the plurality of user devices.

8. A non-transitory computer-readable medium having instructions encoded thereon which, when executed by a processing device, cause the processing device to perform operations comprising:

receiving, by the processing device from a plurality of user devices, network data identifying one or more networks available to provide roaming service to at least one of the plurality of user devices at one or more geographical locations associated with the plurality of user devices;

determining, by the processing device, one or more identifiers, wherein each identifier is associated with a corresponding network of the one or more networks from the network data;

generating, by the processing device, a list of preferred networks associated with a first geographic location of the one or more geographical locations, the list comprising the one or more identifiers of the one or more networks; and sending, by the processing device, the list of preferred networks to a first user device of the plurality of user devices, the first user device being located at the first geographic location.

9. The non-transitory computer-readable medium of claim 8, wherein the first geographical location corresponds to a region where a service acquisition time exceeds a threshold.

10. The non-transitory computer-readable medium of claim 8, wherein the network data further identifies networks that have rejected roaming service requests from any of the plurality of user devices at the first geographical location.

11. The non-transitory computer-readable medium of claim 10, wherein generating the list of preferred networks further comprises:

creating a preliminary list of identifiers of networks that have accepted a roaming service request from at least one of the plurality of user devices; and removing from the preliminary list identifiers of networks that have rejected a roaming service request from at least one of the plurality of user devices at the first geographical location.

12. The non-transitory computer-readable medium of claim 8, wherein generating the list of preferred networks further comprises prioritizing identifiers of the list of identifiers based on at least one of network characteristics or roaming charges.

13. The non-transitory computer-readable medium of claim 8, wherein the network data further identifies one or more preferred networks for one of the plurality of user devices.

14. The non-transitory computer-readable medium of claim 8, the operations further comprising:

periodically receiving additional network data from the plurality of user devices;

updating, based on the additional network data, the list of identifiers; and sending the updated list of identifiers to the plurality of user devices.

15. A system comprising:

a memory; and a processing device coupled to the memory, the processing device configured to:

receive, from a plurality of user devices, network data identifying one or more networks available to provide roaming service to at least one of the plurality of user devices at one or more geographical locations associated with the plurality of user devices;

determine one or more identifiers, wherein each identifier is associated with a corresponding network of the one or more networks from the network data;

generate a list of preferred networks associated with a first geographical location of the one or more geographical locations, the list comprising the one or more identifiers of the one or more networks; and send the list of preferred networks to a first user device of the plurality of user devices, the first user device being located at the first geographic location.

16. The system of claim 15, wherein the first geographical location corresponds to a region where a service acquisition time exceeds a threshold.

17. The system of claim 15, wherein the network data further identifies networks that have rejected roaming service requests from any of the plurality of user devices at the first geographical location.

18. The system of claim 17, wherein to generate the list of preferred networks, the processing device is configured to:

create a preliminary list of identifiers of networks that have accepted a roaming service request from at least one of the plurality of user devices; and remove from the preliminary list identifiers of networks that have rejected a roaming service request from at least one of the plurality of user devices at the first geographical location.

19. The system of claim 15, wherein the processing device is configured to generate the list of preferred networks by prioritizing identifiers of the list of identifiers based on at least one of network characteristics or roaming charges.

20. The system of claim 15, wherein the processing device is further configured to:

periodically receive additional network data from the plurality of user devices;

update, based on the additional network data, the list of identifiers; and send the updated list of identifiers to the plurality of user devices.

* * * * *